(12) United States Patent
Runstedler et al.

(10) Patent No.: US 8,621,351 B2
(45) Date of Patent: Dec. 31, 2013

(54) METHODS AND ELECTRONIC DEVICES FOR SELECTING AND DISPLAYING THUMBNAILS

(75) Inventors: Christopher James Runstedler, Cambridge (CA); Bartholomew Alexander Boeckner, Cambridge (CA); Samer Fahmy, Kitchener (CA)

(73) Assignee: Blackberry Limited, Waterloo, Ontario (CA)

( * ) Notice: Subject to any disclaimer, the term of this patent is extended or adjusted under 35 U.S.C. 154(b) by 373 days.

(21) Appl. No.: 12/871,972

(22) Filed: Aug. 31, 2010

(65) Prior Publication Data

US 2012/0054614 A1  Mar. 1, 2012

(51) Int. Cl.
*G06F 3/00* (2006.01)

(52) U.S. Cl.
USPC .......................................................... 715/719

(58) Field of Classification Search
None
See application file for complete search history.

(56) References Cited

U.S. PATENT DOCUMENTS

| | | | |
|---|---|---|---|
| 5,680,558 | A | 10/1997 | Hatanaka et al. |
| 6,456,307 | B1 | 9/2002 | Bates et al. |
| 7,072,878 | B2 * | 7/2006 | Kotani .................... 1/1 |
| 7,194,701 | B2 | 3/2007 | Stavely et al. |
| 7,574,655 | B2 | 8/2009 | Manders et al. |
| 7,580,568 | B1 | 8/2009 | Wang et al. |
| 7,853,079 | B1 * | 12/2010 | Shrivastava et al. .......... 382/173 |
| 2005/0010955 | A1 * | 1/2005 | Elia et al. ........................ 725/88 |
| 2005/0138574 | A1 | 6/2005 | Lin |
| 2006/0026524 | A1 * | 2/2006 | Ma et al. ........................ 715/713 |
| 2006/0165283 | A1 * | 7/2006 | DeWitt et al. ................. 382/173 |
| 2007/0058876 | A1 | 3/2007 | Tojo |
| 2007/0071404 | A1 | 3/2007 | Curtner et al. |
| 2007/0162873 | A1 * | 7/2007 | Haro et al. ..................... 715/838 |
| 2008/0005128 | A1 | 1/2008 | Jayaraman et al. |
| 2008/0083002 | A1 | 4/2008 | Yamaguchi et al. |
| 2008/0086688 | A1 | 4/2008 | Chandratillake et al. |
| 2008/0138035 | A1 | 6/2008 | Nishiura |
| 2008/0320391 | A1 | 12/2008 | Lemay et al. |
| 2009/0012965 | A1 * | 1/2009 | Franken .......................... 707/10 |
| 2009/0049409 | A1 | 2/2009 | Leclercq et al. |
| 2009/0100462 | A1 | 4/2009 | Park et al. |
| 2010/0050126 | A1 * | 2/2010 | McCrossan et al. .......... 715/840 |
| 2010/0107126 | A1 * | 4/2010 | Lin et al. ....................... 715/838 |

FOREIGN PATENT DOCUMENTS

| | | |
|---|---|---|
| EP | 1045316 | 10/2000 |
| EP | 1830361 | 9/2007 |
| WO | 2007133668 | 11/2007 |
| WO | 2008079587 | 7/2008 |

OTHER PUBLICATIONS

K.I.S. Soft: "Random frame 1.0", Filetransit, Dec. 22, 2006, pp. 1-3, Retrieved from the Internet: http://www.filetransit.com/view.php?id=5110.

(Continued)

*Primary Examiner* — Stephen Alvesteffer
(74) *Attorney, Agent, or Firm* — Bereskin & Parr LLP

(57) ABSTRACT

According to one aspect, a method of previewing multimedia data, including selecting a first graphical representation in association with a multimedia object, displaying the first graphical representation, receiving an input in relation to the first graphical representation, in response to the input, determining whether to change the first graphical representation, and if so then selecting a second graphical representation from the multimedia object in a randomized manner, and displaying the second graphical representation.

20 Claims, 6 Drawing Sheets

(56) References Cited

OTHER PUBLICATIONS

Andrew Collington, "Create random thumbnail of a video file", Jun. 22, 2007, pp. 1-3, Retrieved from the internet: http://blog.amnuts.com/2007/06/22/create-a-random-thumbnail-of-a-video-file/.

Julie Perry: "Youtube Change: No more Youtube video thumbnail control", Youtube secret weapon, Dec. 3, 2008, pp. 1-2, Retrieved from the internet: http://www.youtubesecretweapon.com/blog/youtube-change-no-more-youtube-video-thumbnail-control/.

Extended European Search Report, European Patent Office, for European Patent Application Serial No. 10174664.2 mailed Nov. 9, 2010.

Response to Extended European Search Report, Ipulse, for European Patent Application Serial No. 10174664.2 filed Jul. 8, 2011.

Written Opinion and International Search Report, International Bureau, for International PCT Patent Application Serial No. PCT/CA2011/000982 dated Nov. 10, 2011.

Jonathan Ledlie, "File System Support for Low-Bandwidth Thumbnails", May 6, 2008, Retrieved from the internet: http://research.nokia.com/files/NRCTR2008004.pdf.

Expert Exchange, "File List Box with Thumbnails", Apr. 24, 2009, Retrieved from the internet: http://www.experts-exchange.com/Programming/Languages/Pascal/Delphi/Components/Q_24352081.html.

Yunpeng Xiao, Yang Tao, Wenji Li, "A Dynamic Web Page Adaptation for Mobile Device Based on Web2.0", Advanced Software Engineering and Its Applications, Dec. 2008. ASEA 2008, Retrieved from the internet: http://ieeexplore.ieee.org/xpls/abs_all.jsp?arnumber=4721325.

* cited by examiner

METHODS AND ELECTRONIC DEVICES FOR SELECTING AND DISPLAYING THUMBNAILS

FIELD

Implementations herein relate generally to previewing of multimedia data, and more particularly to methods and electronic devices for previewing video multimedia data using at least one graphical representation.

INTRODUCTION

Electronic devices are often used to obtain and store multimedia data, such as video files. On some electronic devices, a thumbnail or other image may be presented as a graphical representation that corresponds to particular multimedia data (e.g. a video object, a slide-show, a music file, and so on). Actions may be performed on the multimedia data by taking some action in relation to the graphical representation (e.g. a user may play a video media object by clicking on an associated thumbnail).

In some cases, thumbnails are still pictures such as photographs, drawings or icons. In the case of multimedia data that includes video, a thumbnail may be an image taken from the video itself (e.g. a frame from the video).

When thumbnails are used to represent videos, it may be desirable that the thumbnails give some visual indication of the content of the video. However, sometimes the particular thumbnail being displayed may not provide a desired indication of the video. For example, the thumbnail may not accurately represent the content of the video or may not distinguish the content of that video from other videos.

BRIEF DESCRIPTION OF THE DRAWINGS

For a better understanding of implementations described herein, and to show how they may be carried into effect, reference will now be made, by way of example, to the accompanying drawings.

DETAILED DESCRIPTION

Generally, the concepts described herein are directed to selection of graphical representations corresponding to multimedia data. In particular, some of the concepts herein pertain to thumbnails for videos that may be selected and displayed in a randomized manner in response to a user input.

For example, a first thumbnail may be displayed on a display in association with a particular video. An input may be received to indicate whether the first thumbnail is acceptable, or whether a new thumbnail is desired. If a new thumbnail is desired, the new thumbnail can be selected in a randomized manner (e.g. by randomly selecting a frame from the video). The new thumbnail can then be displayed on the display in association with the video.

In some cases, another input may be received to indicate whether the new thumbnail is acceptable, or whether another thumbnail is desired.

This process can generally be repeated until the displayed thumbnail is a desired thumbnail. This may allow a user to select more meaningful or interesting thumbnails to represent particular videos without reviewing the video to locate a desired thumbnail.

Generally, the term "randomized manner" includes random or pseudo-random selection of thumbnails. The term "randomized manner" also includes selection of thumbnails according to some particular pattern or sequence, and which may have some non-random elements. For example, the pattern or sequence may be predetermined.

Generally, implementations as described herein may be implemented on one or more electronic devices, which may include a wide range of devices, such as mobile phones, smart phones, personal digital assistants (PDAs), personal or desktop computers, notebooks, laptops, digital audio/video players, digital video recorders, tablet computers, and so on.

On some of these electronic devices, particular computer resources (e.g. memory capacity, processing power and screen space) may be more limited than on other devices. A portable smart phone, for example, may have a smaller display and less memory capacity than a personal computer, which may have a larger display and more memory. However, the concepts as described herein are not limited to any particular kind of electronic device, but are generally suitable for use on various electronic devices with differing computer resources.

In some implementations, the electronic device may be a portable electronic device, such as a smart phone or PDA, and which may have voice communication capabilities, data communication capabilities, or both, over one or more of a wired connection or a wireless connection.

In some implementations the implementation is carried out using a non-transient computer readable medium having stored thereon computer readable instructions comprising instructions which, when executed, cause the electronic device to perform the implementation.

Figure 1:
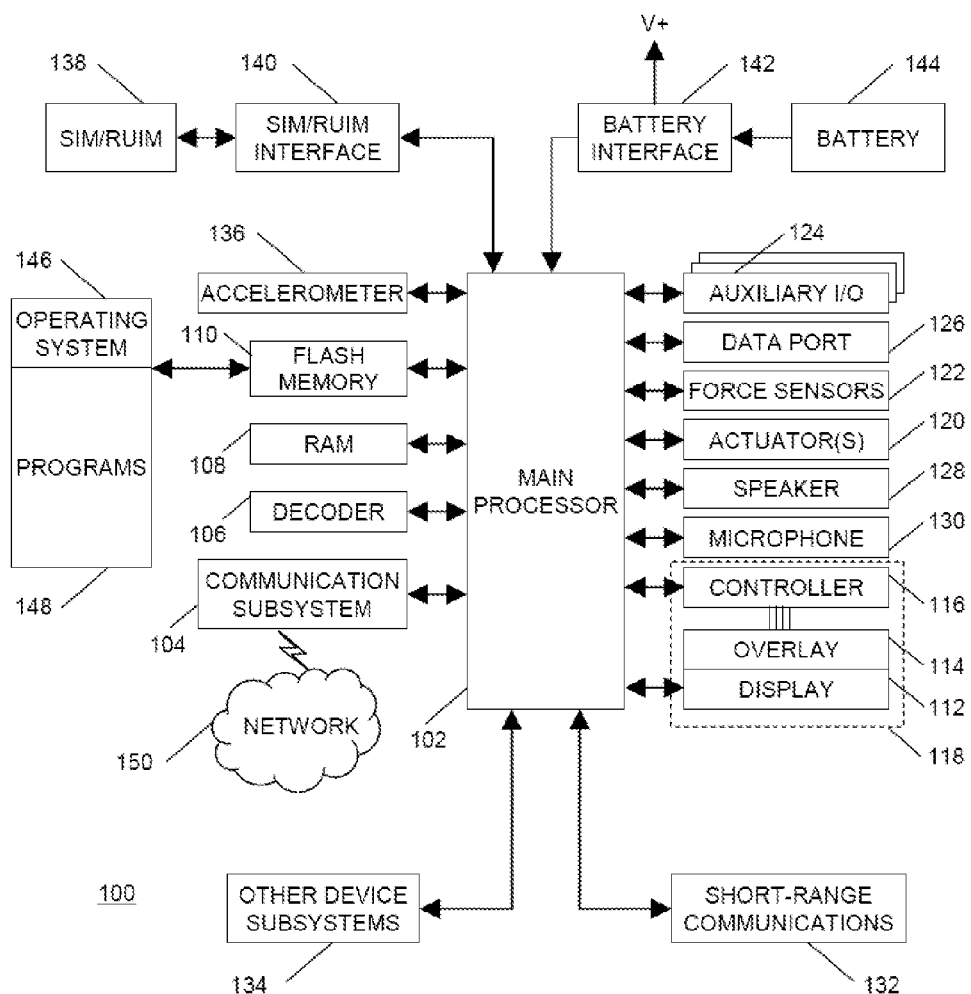
FIG. 1 is a schematic representation of an electronic device according to one implementation.

For example, FIG. 1 shows a simplified block diagram of components of a portable electronic device 100 according to one implementation.

The portable electronic device 100 generally has multiple components including a processor 102 that can control operation of the portable electronic device 100. In some implementations, the processor 102 may be a microprocessor. In some implementations, the processor 102 may be a Central Processing Unit (CPU). In some implementations, the processor 102 may be a Field Programmable Gate Array (FPGA).

In some implementations, communication functions, including data communications, voice communications, or both, may be performed on the portable electronic device 100 using a communication subsystem 104. In some implementations, data received by the portable electronic device 100 may be decompressed and decrypted by a decoder 106.

In some implementations, the communication subsystem 104 may be used to send and receives messages over a wireless network 150. The wireless network 150 generally may be any type of wireless network, including data-centric wireless networks, voice-centric wireless networks, and dual-mode networks that support both voice and data communications.

In some implementations, the portable electronic device 100 may be a battery-powered device and may include a battery interface 142 for receiving one or more rechargeable (or non-rechargeable) batteries 144.

The processor 102 may also interact with additional subsystems, such as a Random Access Memory (RAM) 108, a flash memory 110, a display 112 (which may have a touch-sensitive overlay 114 connected to an electronic controller 116 that together comprise a touch-sensitive display 118), an actuator assembly 120, one or more optional force sensors 122, an auxiliary input/output (I/O) subsystem 124, one or more data ports 126, a speaker 128, a microphone 130, short-range communications subsystems 132, and other device subsystems 134.

In some implementations, user-interaction with the portable electronic device 100 may be performed through the touch-sensitive display 118. For example, the processor 102 may interact with the touch-sensitive overlay 114 via the electronic controller 116. Information, such as text, characters, symbols, images, icons, and other items may be displayed or rendered on the touch-sensitive display 118.

In other implementations, the display 112 need not be touch-sensitive. In such cases, user-interaction with the portable electronic device 100 may be performed using one or more other input devices, such as a keypad or buttons.

In some implementations, the display 112 may be a Liquid Crystal Display (LCD), a Cathode Ray Tube (CRT) display, a plasma display panel, a projection unit, an Organic Light-Emitting Diode (OLED) or a Surface Electron Emitter Display (SED).

In some implementations, the processor 102 may also interact with an accelerometer 136 as shown in FIG. 1. The accelerometer 136 may be utilized for detecting direction of gravitational forces or gravity-induced reaction forces, and in some cases may be used to determine a position or orientation of the portable electronic device 100.

In some implementations, to identify a subscriber for network access, the portable electronic device 100 may use a Subscriber Identity Module or a Removable User Identity Module (SIM/RUIM) card 138 inserted into a SIM/RUIM interface 140 for communication with the wireless network 150. Alternatively, in other implementations, user identification information may be programmed into the flash memory 110 or using other suitable techniques.

Generally, the portable electronic device 100 includes an operating system 146 and software components 148 that are executed by the processor 102 and which may be stored in a persistent store, such as the flash memory 110. In some cases, additional applications may be loaded onto the portable electronic device 100 through the wireless network 150, the auxiliary I/O subsystem 124, the data port 126, the short-range communications subsystem 132, or other suitable device subsystems 134.

In use, a received signal such as a text message, an e-mail message, or web page download may be processed by the communication subsystem 104 and input to the processor 102. The processor 102 may then process the received signal for output to the display 112 or to the auxiliary I/O subsystem 124. In some cases, a user may compose data items, such as e-mail messages, which may be transmitted over the wireless network 150 through the communication subsystem 104.

In some implementations, voice communications may be similarly performed. For example, the speaker 128 may output audible information converted from electrical signals, and the microphone 130 may convert audible information into electrical signals for processing.

It may be noted that FIG. 1 is a conceptual or schematic diagram, and that one or more of the components shown therein may be combined into one or more physical electronic components (e.g. one or more hardware components).

Figure 2:
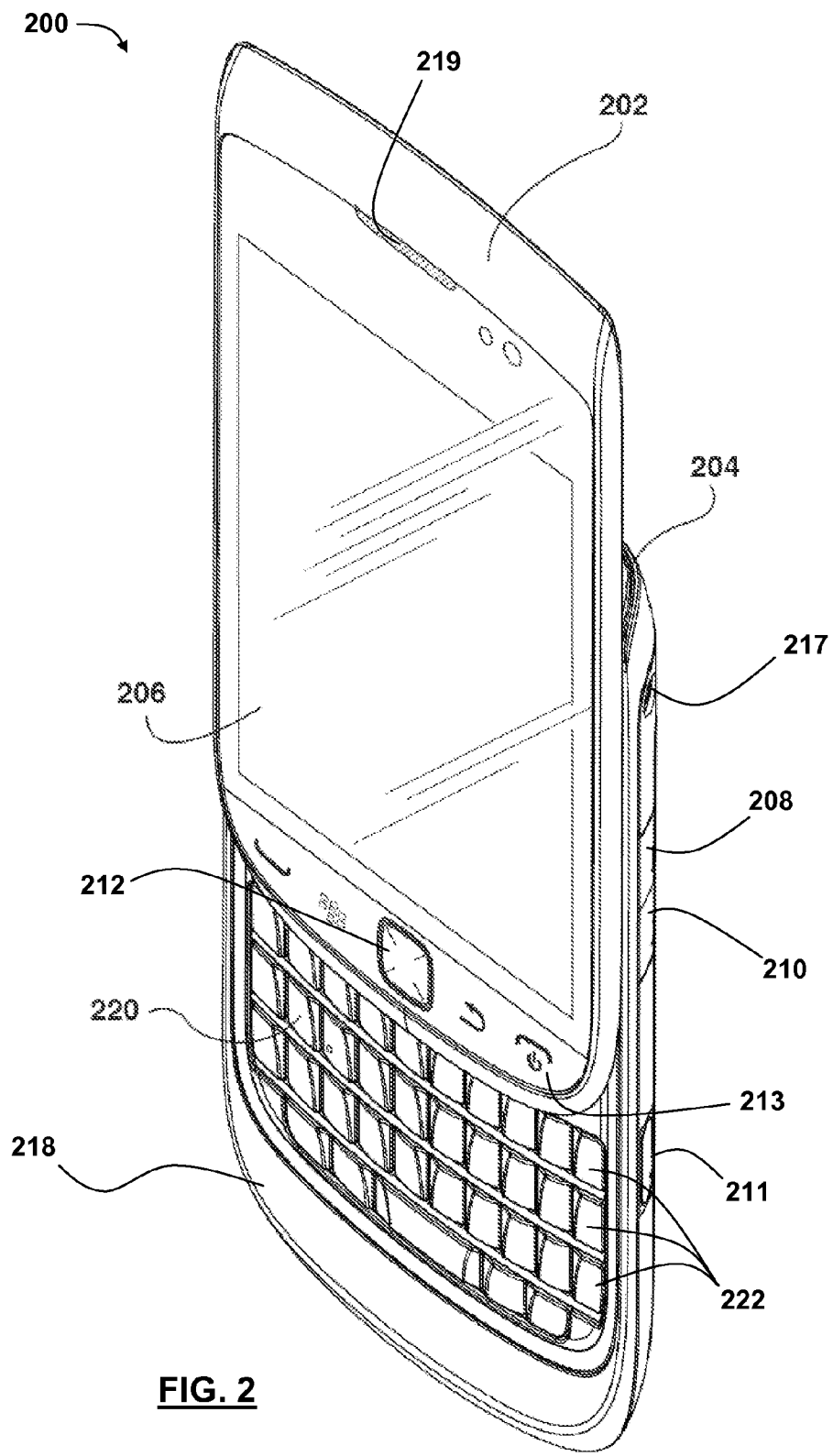
FIG. 2 is a perspective view of a portable electronic device according to one implementation for displaying graphical representations associated with videos.

Turning now to FIG. 2, illustrated generally therein is a portable electronic device 200 for displaying graphical representations associated with multimedia objects, such as videos, according to one implementation.

In this implementation, the portable electronic device 200 is a "slider" device and generally includes an upper housing 202 (or sliding portion) and a lower housing 204 (or base portion). The upper housing 202 and lower housing 204 are coupled together and are slidable between a closed position (not shown) and an open position (e.g. as shown in FIG. 2).

In other implementations, the portable electronic device 200 may not be a "slider" device, but may generally have any other suitable configuration. For example, the portable electronic device 200 may be a "candy bar" style device, a "flip" style device, and so on.

As shown, the portable electronic device 200 generally includes a display 206, which could be an LCD display or other suitable display, and which may correspond to the display 112 as discussed above. In some implementations, the display may have touch screen capabilities (and may correspond to the touch-sensitive display 118 as discussed above). In other implementations, the display 206 may not have touch screen capabilities.

In some implementations, the portable electronic device 200 may include one or more input devices, such as navigation keys or buttons, a physical or virtual keyboard or keypad, a trackpad, a touchpad, a trackball, multimedia keys, etc.

For example, the upper housing 202 of the portable electronic device 202 may include an auxiliary input device 212. In some implementations, the auxiliary input 212 device may be an optical navigation module (e.g. an optical trackpad) that responds to user interaction, and which may be used for navigating on the display screen 206, to select objects on the display screen 206, or for other purposes.

In other implementations, the auxiliary input device 212 may be a mechanical device that responds to manual user interaction (e.g. a trackball that responds to the movement of a user's finger or thumb).

The portable electronic device 200 may also include other input devices, such as buttons 208, 210, a dedicated application button 211 (which could be used to automatically launch a particular application, such as a camera application), an "on/off" button 213, etc. In various implementations, at least one of these input devices may include optical sensors, mechanical buttons, or both.

The portable electronic device 200 could also include one or more input or output ports (e.g. I/O ports), such as a microUSB port (and which may correspond to data port 126). In some examples, the microUSB port may be used for data communication with the portable electronic device 200, for charging a battery, or for both.

In some implementations, the portable electronic device 200 may also include an audio jack 217. The audio jack 217 may be used to couple the portable electronic device 200 to a speaker or a microphone (or both) for use in voice communication, for listening to music or videos, etc.

The portable electronic device 200 may also include an auxiliary output device 219, which could for example be a speaker (and which may correspond to speaker 128 as described above).

As shown, the portable electronic device 200 may also include a keyboard or keypad 220 (shown here on a lower portion 218 of the lower housing 204). The keypad 220 may include a plurality of alphanumeric keys 222, and which may be positioned in various rows and columns. In some implementations, the keys 222 may represent at least a portion of an alphabet and may be arranged according to one or more standard keyboard layouts (e.g. QWERTY, QWERTZ, DVORAK, etc.)

As discussed above, in some implementations the display 206 may be a touch-sensitive display. The touch-sensitive display may be a capacitive touch-sensitive display, for example, and a user's touch on the touch-sensitive display may be determined by determining an X and Y location of the touch, with the X location determined by a signal generated as a result of capacitive coupling with a first touch sensor layer and the Y location determined by the signal generated as a result of capacitive coupling with another touch sensor layer. Each of the touch-sensor layers may provide a signal to a controller that represents the respective X and Y touch location values. Thus, features such as a virtual button or other feature displayed on the touch-sensitive display may be selected by a mapping of the touch location (e.g. from a user's finger) to a feature on the touch-sensitive display.

Figure 3:
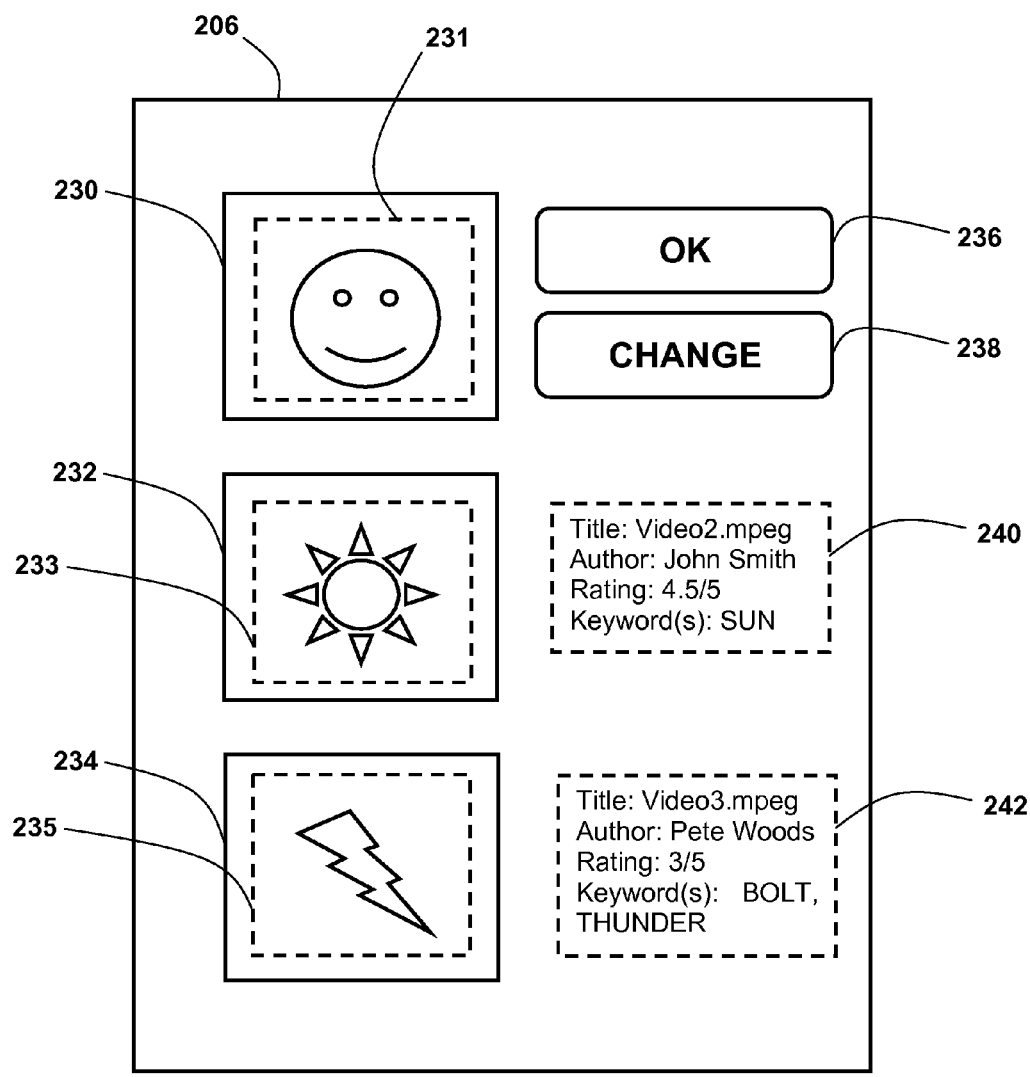
FIG. 3 is a schematic view of the display of the portable electronic device of FIG. 2.

Turning now to FIG. 3, the display 206 of the portable electronic device 200 may be used to display at least one graphical representations associated with at least one video or other multimedia data object.

As shown, the display 206 may have a plurality of display regions, including a first display region 230, a second display region 232 and a third display region 234. Each display region 230, 232, 234 may display at least one graphical representation that is associated with a particular multimedia object (e.g. a video object, a slide-show, a music file, a music album, a podcast, an audiobooks, a radio station, etc.).

For example, in this implementation the first display region 230 currently displays a first graphical representation 231 (e.g. a thumbnail image of a "smiley face") that is associated a first video object. Similarly, the second display region 232 currently displays a graphical representation 233 (e.g. an image of a "sun") associated with a second video object, and the third display region 234 displays a graphical representation 235 (e.g. an image of a "thunderbolt") associated with a third video object.

In some implementations, the graphical representations 231, 233, 235 may be thumbnail images selected from one or more frames of their respective video objects.

In some implementations, actions may be performed on the multimedia objects by taking some action in relation to the associated graphical representation. For example, a user may play the first video object by clicking on the first graphical representation 231.

In some implementations, the display 206 may present one or more input elements, such as a first control element 236 (e.g. an "OK" button) and a second control element 238 (e.g. a "CHANGE" button) for receiving inputs in association with one or more of the multimedia objects. In implementations where the display 206 has touch screen capabilities, the control elements 236, 238 may be activated by a user's touch (e.g. using a finger, stylus, or a pointing device). In other implementations, such as where the display 206 does not have touch screen capabilities, the control elements 236, 238 may be activated using one or more input devices, such as by using the trackpad 212 to manipulate a cursor on the display 206 and activate the control elements 236, 238.

In some implementations, the display 206 may present related information about the media items being presented. For example, as shown metadata 240, 242 may be associated with the second and third videos, respectively (e.g. by presenting the metadata 240 adjacent the second display region 232 and the metadata 242 adjacent the third display region 234). The metadata 240, 242 may include information associated with each particular video object. For example, the metadata 240, 242 may include data such as the titles of the video, author information for the video, rating information for the video, keywords associated with the video, etc.

As described above, in some cases the graphical representations 231, 233, 235 may be thumbnail images taken from the associated video. Generally, it may be desirable that the graphical representations 231, 233, 235 give some visual indication of the content of the videos. However, sometimes the particular graphical representation 231, 233, 235 being displayed may not provide a desired indication of the video.

For example, the first graphical representation 231 (e.g. the "smiley face") may not present a desired frame of the first video (e.g. the "smiley face" may not be relevant to the nature of the video, or may not convey a relevant meaning for the video).

According to some of the implementations as described herein, when a particular graphical representation is being displayed on the display, an input may be received to indicate that that particular graphical representation is acceptable, or whether it is desired that it should be replaced by another new graphical representation.

Figure 4:
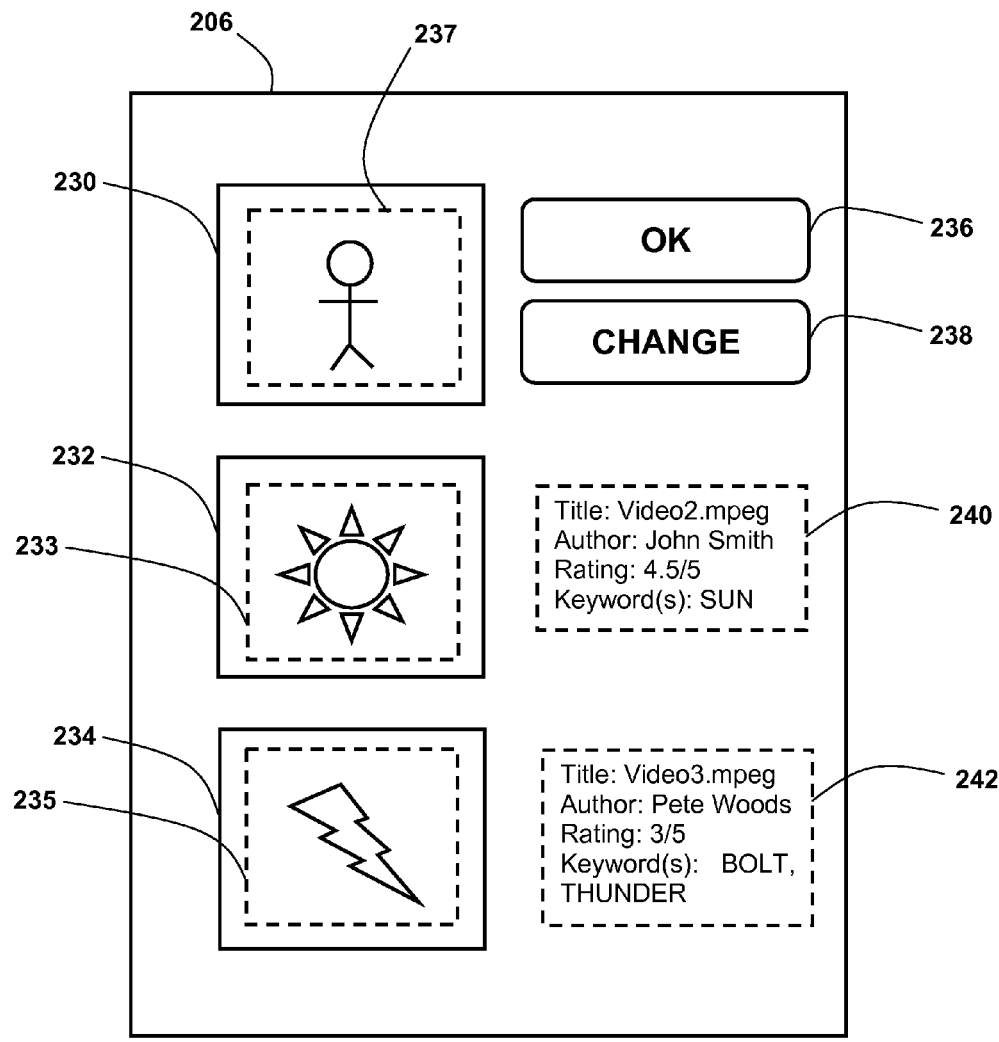
FIG. 4 is another schematic view of the display of the portable electronic device of FIG. 2.

For example, when the first graphical representation 231 is displayed on the display 206, the user may activate the second control element 238 (e.g. the "CHANGE" button) to indicate that the first graphical representation 231 is undesirable and should be changed. In response to the input, the first graphical representation 231 can be replaced by another new graphical representation, for example a new graphical representation 237, as shown in FIG. 4.

Alternatively, the user may activate the first control element 236 (e.g. the "OK" button) to indicate that the displayed graphical representation (e.g. the first graphical representation 231) is acceptable for that particular video.

Generally, the selection of the new graphical representation may be performed in any suitable manner. For example, in some implementations the new graphical representation (e.g. the new graphical representation 237) may be selected in a randomized manner that includes using a random number generator to randomly select one frame from the video object.

In some implementations, the randomized manner can be purely random, in that the new graphical representation can be any frame selected from the video, and could in fact be the same graphical representation as the currently displayed graphical representation.

In other implementations, the randomized manner can be constrained according to one or more selection criteria. For example, the random selection of the new graphical representation may be limited so that the new graphical representation is different from the original graphical representation (or from at least one previously discarded graphical representation), thus tending to avoid repeating a previously presenting graphical representation.

In some implementations, the "randomized manner" of selection could include selecting the new graphical representation according to a particular pattern or sequence which may include at least some non-random elements. For example, the new graphical representation could be selected to be at least particular number of frames away from the previous graphical representation (e.g. at least ten frames), or a particular quantity of time away from the previous graphical representation (e.g. at least ten seconds). This may increase the likelihood that the new graphical representation is visually distinct from the original graphical representation.

In another example, the new graphical representation could be selected from a frame that occurs in the video after the previous graphical representation, with respect to the normal time sequence for playback of that particular video. In yet another example, the new graphical representation could be selected from a frame that occurs in the video before the previous graphical representation.

In some implementations, the "randomized manner" could include selecting the new graphical representation according to a non-random process. For example, a particular selection scheme could be predetermined (e.g. each new graphical representation should be ten frames after the previous graphical representation).

In some implementations, the new graphical representation may be selected without performing a detailed analysis of the content of the video (e.g. based on a random number generator). This may help to reduce the consumption of computing resources (e.g. processor power and memory).

In other implementations, the selection of the new graphical representation may be based on performing at least some analysis of the content of the video. For example, at least some portion of the video could be analyzed and the new graphical representation selected from a different scene of the video, or from a different angle of the video.

In some implementations, each new graphical representation can be selected so as to be visually distinct from the previously selected graphical representation (or from at least one of the previously presented graphical representations). In some implementations, this may include selecting a new graphical representation as a candidate for displaying (e.g. in a randomized manner), performing some type of analysis on the new graphical representation to determine whether it is visually distinct from the at least one previous graphical representation, and if the new graphical representation is acceptable then displaying the new graphical representation.

Accordingly, some implementations as described herein may provide an easier way for a user to generate a new thumbnail or other graphical representation for a particular video or other multimedia object by requesting that the displayed graphical representation be changed, and this process may be repeated until a desired graphical representation is displayed. This may be advantageous as opposed to having the user search through the video to manually locate a desired graphical representation. Additionally, this may add an element of "fun" to the user experience of setting of video thumbnails, and users may be entertained by observing which images are selected and displayed on the display and then deciding whether to accept or change a particular graphical representation.

In some implementations, when a graphical representation is displayed, if an input is not received within a particular period of time (e.g. ten seconds), the graphical representation may be automatically replaced with a new graphical representation. For example, if the first graphical representation 231 has been displayed on the display 206 for ten seconds without an input being received (e.g. through either of the control elements 236, 238), the first graphical representation 231 may be replaced by the new graphical representation 237 selected from the video in a randomized manner. In such implementations, the displayed graphical representation can be "cycled" at particular time intervals until a desired graphical representation is displayed.

Figure 5:
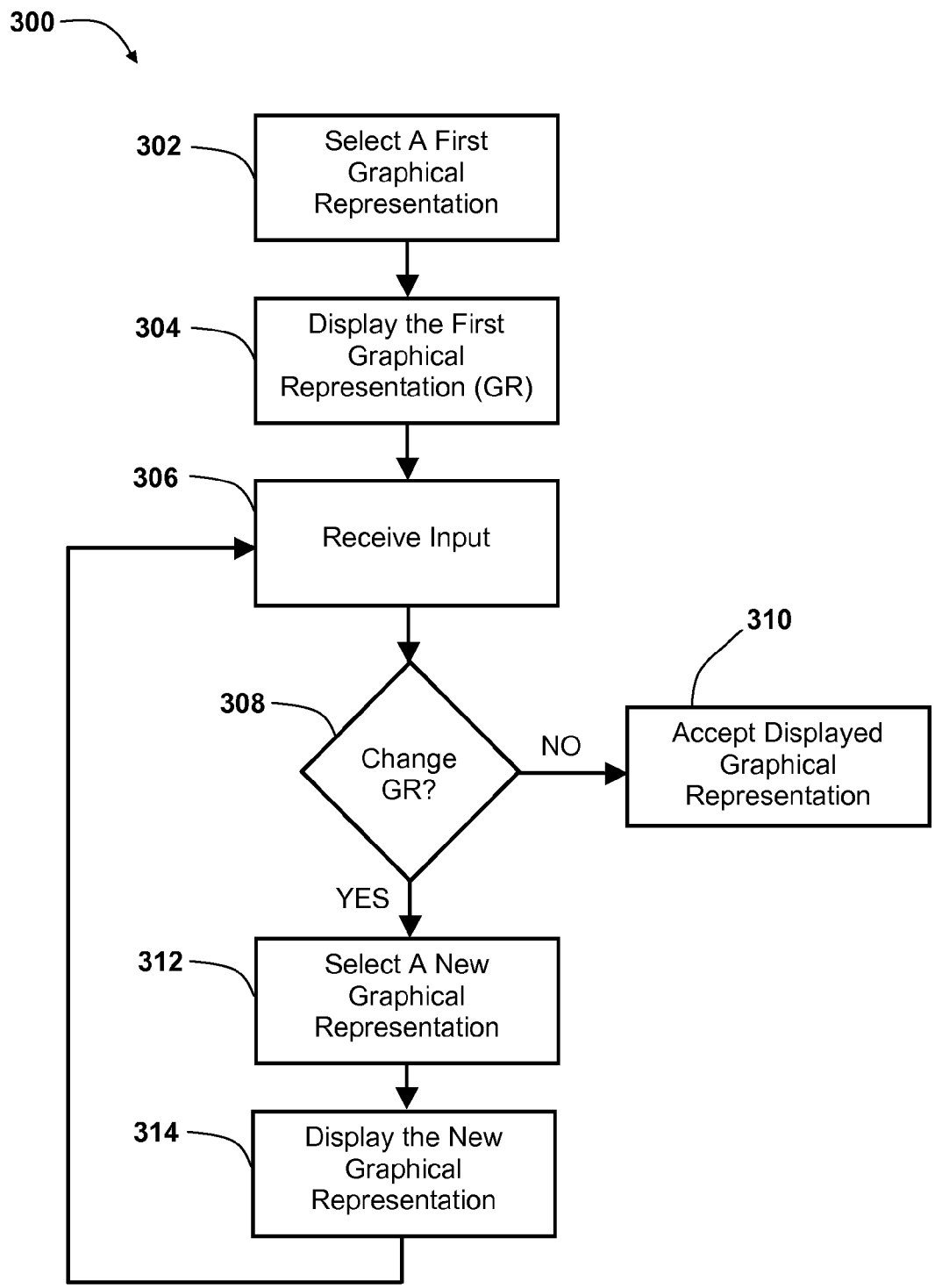
FIG. 5 is a flowchart of a method for displaying graphical representations associated with videos according to one implementation.

Reference is now made to FIG. 5, which depicts a flow chart of a method 300 of displaying graphical representations of videos or other multimedia objects.

At step 302, the method 300 includes selecting a first graphical representation associated with a particular video or other multimedia item. For example, the first graphical representation may be a frame of the video, or another image. In some implementations, the first graphical representation may be selected according to particular criteria (e.g. the first graphical representation may be the first frame of the video, the fifth frame of the video, etc.). In other implementations, the first graphical representation may be selected according to some randomized manner (e.g. the first graphical representation 231 may be randomly selected from the video or be selected according to a particular non-random pattern).

At step 304, this first graphical representation is displayed. For example, the first graphical representation 231 may be displayed on the display 206 of the portable electronic device 200.

At step 306, an input is received in association with the first graphical representation. For example, this could be a user input received through a touchscreen display (e.g. display 206) or using another input device (e.g. auxiliary input device 212).

At step 308, a determination is made as to whether the input is requesting a change of the first graphical representation. For example, the user may select the second control element 238 (e.g. the "CHANGE" button), to indicate that the user wants to change the first graphical representation associated with that video to a different graphical representation. This could for example indicate that the user does not consider the first graphical representation to adequately represent the video. If a change request is detected, the method 300 then proceeds to step 312.

However, if the input indicates that the first graphical representation is acceptable and does not need to be changed (e.g. the user may select the first control element 236, the "OK" button), the method 300 may then proceed to step 310.

At step 310, the method 300 may indicate that the displayed graphical representation is accepted. The method 300 may then terminate, proceed to another video object, or take some other action (e.g. displaying a dialog box indicating that the displayed graphical representation has been accepted).

At step 312, a new graphical representation is selected. For example, as discussed the new graphical representation may be selected in a "randomized manner", which could include random or pseudo-random selection of a thumbnails, or selection of thumbnails according to some particular non-random pattern or sequence. For example, the new graphical representation 237 may be selected from the video.

At step 314, the new graphical representation is displayed. For example, the new graphical representation 237 may be displayed on the display 206.

In some implementations, before the new graphical representation 237 is displayed on the display 206, some analysis may be performed to determine whether the new graphical representation 237 is visually distinct from the first graphical representation, and if not the new graphical representation 237 may be discarded and another new graphical representation selected.

In some implementations, after step 314 the method 300 may then return to step 306, where an input may be received to indicate whether the new displayed graphical representation is acceptable, or should be changed.

In some implementations, the method 300 can be repeated until a desired graphical representation has been identified.

Figure 6:
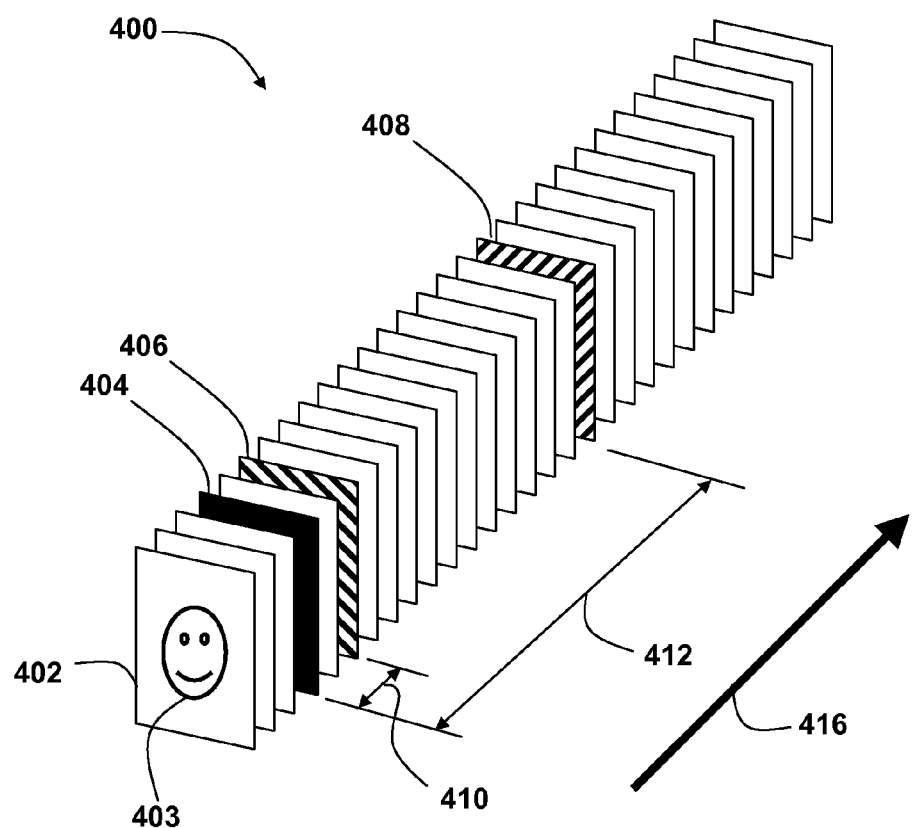
FIG. 6 is a schematic view of a video having a plurality of frames.

Turning now to FIG. 6, illustrated therein is schematic view of a video 400 having a number of frames. For example, the video 400 may have a first frame 402 that shows an image 403 of a "smiley face", and which may be used as the first graphical representation 231. The video 400 also includes a plurality of other frames, including frames 404, 406 and 408.

As discussed above, in some implementations when an input is received to replace the currently displayed graphical representation with a new graphical representation, the new graphical representation can be selected from a frame of the video (e.g. video 400) according to some randomized manner. For example, the new frame 404 could be selected based on a random or pseudo-random selection.

In some implementations, the term "randomized manner" could include selecting the new graphical representation based on a non-random pattern. For example, the frame 406 could be selected as the new graphical representation by selecting the fifth frame after the previously displayed frame (e.g. frame 402).

In some implementations, the new frame (e.g. frame 406) could be selected following a scene change, thus providing a visually distinct new graphical representation from a previously presented frame (e.g. frame 404). This may be true even though the frames 404, 406 may only be separated by a small number of frames (e.g. two frames, as indicated generally at 410).

In some implementations, a new frame 408 could be selected after a previous frame (e.g. frame 404) based on a criteria that the new frame be at least a certain number of frames after the previous frame (e.g. fourteen frames, as indicated generally as 412).

In some implementations, the frames 402, 404, 406, 408 may be selected in a sequence or order that corresponds to the normal playback sequence of the video 400 (as indicated generally at 416). For example, frame 408 will be selected for display after frame 406, which will be selected for display after frame 404, and so on. In other implementations, the frames 402, 404, 406, 408 may be selected without regard to the order of the frames as they appear in the video 400.

The foregoing aspects of the method and the electronic device are provided for exemplary purposes only. Those skilled in the art will recognize that various changes may be made thereto without departing from the spirit and scope of the method and the electronic device as defined by the appended claims.

The invention claimed is:

1. An electronic device, comprising:
   a processor;
   a display coupled to the processor;
   a non-transitory memory coupled to the processor and storing instructions which, when executed by the processor
   configure the processor to:
   select a first thumbnail from a video;
   render the first thumbnail on the display without rendering any other thumbnails from the video;
   receive an input indicative of whether the first thumbnail is an acceptable representation of the video and
   in response to the input, if the first thumbnail is not an acceptable representation of the video, then:
   select a second thumbnail from the video in a randomized manner; and
   replace the first thumbnail with the second thumbnail on the display so that only a single thumbnail from the video is rendered at one time.

2. The electronic device of claim 1, wherein the processor is further configured to:
   receive another input indicative of whether the second thumbnail is an acceptable representation of the video, and in response to this input, if the second thumbnail is not an acceptable representation of the video, then:
   select a third thumbnail from the video in a randomized manner; and
   replace the second thumbnail with the third thumbnail on the display so that only a single thumbnail from the video is rendered at one time.

3. The electronic device of claim 1, wherein the first and second thumbnails are frames of the video.

4. The electronic device of claim 3, wherein the frame of the second thumbnail occurs in the video after the frame of the first thumbnail.

5. The electronic device of claim 1, wherein the randomized manner includes random selection of the second thumbnail.

6. The electronic device of claim 1, wherein the randomized manner includes selection of the second thumbnail according to a particular pattern that includes at least some non-random elements.

7. The electronic device of claim 1, wherein the second thumbnail is visually distinct from the first thumbnail.

8. The electronic device of claim 1, wherein the second thumbnail is selected to be at least a particular number of frames away from the first thumbnail.

9. The electronic device of claim 1, wherein the processor is further configured to, before displaying the second thumbnail, analyze the second thumbnail to determine whether it is visually distinct from the first thumbnail, and if so then rendering the second thumbnail on the display.

10. The electronic device of claim 1, wherein, if the input is not received within a particular period of time after the first thumbnail is displayed, then the processor automatically selects and renders the second thumbnail.

11. A method of previewing multimedia data, comprising:
   selecting a first graphical representation in association with a multimedia object;
   displaying the first graphical representation without displaying any other graphical representations associated with that multimedia object;
   receiving an input indicative of whether the first graphical representation is an acceptable representation of the multimedia object;
   in response to the input, if the first graphical representation is not an acceptable representation of the multimedia object, then:
   selecting a second graphical representation from the multimedia object in a randomized manner; and
   replacing the first graphical representation with the second graphical representation so that only a single graphical representation is rendered at one time.

12. The method of claim 11, further comprising:
   receiving an input indicative of whether the second graphical representation is an acceptable representation of a multimedia object, and
   in response to this input, if the second graphical representation is not an acceptable representation of the multimedia object,
   then:
   selecting a third graphical representation from the multimedia object in a randomized manner; and
   replacing the second graphical representation with the third graphical representation so that only a single graphical representation is rendered at one time.

13. The method of claim 11, wherein the multimedia object is a video, and wherein the second graphical representation is a frame of the video.

14. The method of claim 13, wherein the frame of the second graphical representation occurs in the video after the previous graphical representation.

15. The method of claim 11, wherein the randomized manner includes random selection of the second graphical representation.

16. The method of claim 11, wherein the randomized manner includes selection of the second graphical representation according to a particular pattern that includes at least some non-random elements.

17. The method of claim 11, wherein the second graphical representation is visually distinct from the first graphical representation.

18. The method of claim 11, wherein the second graphical representation is selected to be at least a particular number of frames away from the first graphical representation.

19. The method of claim 11, further comprising, before displaying the second graphical representation, analyzing the second graphical representation to determine whether it is visually distinct from the first graphical representation, and if so then displaying the second graphical representation.

20. The method of claim 11, wherein, if the input is not received within a particular period of time after the first graphical representation is displayed, then automatically selecting the second graphical representation.

* * * * *